3,660,570
Patented May 2, 1972

3,660,570
TREATMENT FOR HEART WORM MICROFILARIAE
Marguriette N. Davis, Rte. 2, P.O. Box 356,
Theodore, Ala. 36582
No Drawing. Continuation-in-part of application Ser. No. 541,901, Mar. 21, 1966. This application Sept. 24, 1968, Ser. No. 762,152
Int. Cl. A61k *27/00*
U.S. Cl. 424—147          5 Claims

ABSTRACT OF THE DISCLOSURE

An aqueous composition useful for treating animals for heart worm microfilariae prepared by reacting in an aqueous medium, tobacco, Epsom salts, hydrated lime, sulfur, ferrous sulfate and turpentine.

RELATED APPLICATIONS

This application is a continuation-in-part of application Ser. No. 541,901, filed Mar. 21, 1966, now abandoned.

FIELD OF THE INVENTION

The present invention is directed to a product, and the method of making that product, which is useful in the treatment of animals, such as dogs, which are afflicted with heart worm microfilariae. The product of the present invention, which is administered orally, will act rapidly to prevent heart worm microfilariae from multiplying and growing. By eliminating the microfilariae, the product also acts, over a period of time, to reduce the presence of heart worms in the treated animals. In addition, the product also helps to destroy parasitic insects that transfer and reinfect animals with the heart worm microfilariae.

BACKGROUND OF THE INVENTION

In recent years, heart worm has become a common affliction of dogs, particularly in the southern United States. Heart worms make dogs sluggish and cause coughing, blindness and even death. Prior to the present invention, no satisfactory treatment for this affliction has been developed. Dogs afflicted with heart worm microfilariae have been treated by giving them a series of injections of an arsenic containing composition. This treatment takes a very long time, has proven to be extremely strenuous on the dogs, and has not been particularly successful. On the other hand, the composition of the present invention can be administered orally and successfully eliminate heart worm microfilariae relatively rapidly.

SUMMARY OF THE INVENTION

It has now been found that an aqueous composition prepared by reacting, in an aqueous medium, about one part by weight tobacco, about one part by weight Epsom salts, about 1.2 parts by weight hydrated lime, about 0.8 part by weight sulfur, about 0.8 part by weight ferrous sulfate, and about 21 fluid ounces of turpentine per 100 pounds total weight of the other recited solid ingredients, is useful in the treatment of dogs afflicted with heart worm microfilariae. The mixture of ingredients is reacted at an elevated temperature (e.g. at a temperature greater than 150° F.), the resultant composition is allowed to settle whereby an aqueous phase and a solid phase are formed, and the product is recovered by decanting at least a portion of the aqueous phase. The resultant product is a clear greenish liquid. A minor amount of flavoring agent, such as pork bacon oil, may be added to the composition to make it more palatable to dogs.

DETAILED DESCRIPTION OF THE INVENTION

An important aspect of the present invention is in the use of a high purity sulfur. The sulfur employed is preferably in the form of a powder and contains about 99.5% sulfur and only about 0.5% impurities. The sulfur may contain about 0.45% arsenic as an impurity. It will be appreciated that even a more pure grade of sulfur can be used and the trace amount of arsenic may be added directly to the aqueous reaction medium.

The type of tobacco employed is not critical; any form, such as stems or dust may be employed. Tobacco is an important ingredient in the composition. If the tobacco is replaced by extraction nicotine, the resultant composition is not as effective, with respect to the eradication of parasites and insects, as the composition obtained when tobacco is employed.

The amount of water present in applicant's composition is not critical and may be varied over wide ranges. Of course the amount of the aqueous composition which is administered to the animals will vary depending, inter alia, upon the amount of water present.

The reactions which take place when the ingredients employed to prepare applicant's composition are admixed are unknown. Possible reactions include:

(1) 
$$Ca(OH)_2 + FeSO_4 \rightarrow CaSO_4 + Fe(OH)_2$$

The ferrous hydroxide thus formed may be at least partially oxidized to ferric hydroxide, which would precipitate out of the aqueous reaction medium.

(2) 
$$Ca(OH)_2 + MgSO_4 \rightarrow CaSO_4 + Mg(OH)_2$$

Any magnesium hydroxide formed would also tend to precipitate out.

The following specific example further illustrates the present invention. About nineteen gallons of water are placed in a 50 gallon vessel, such as a 50 gallon drum. The water is heated to 190° F. and about 10 pounds of tobacco stems or dust are added. The mixture is allowed to simmer for about 45 minutes and then about 12 pounds of hydrated lime are added. The resultant mixture is stirred constantly for about 10 minutes, after which time about 8 pounds of high purity sulfur (about 99.5% sulfur, about 0.45% arsenic and about 0.5% total impurities) is added. After about 10 minutes about 8 pounds of ferrous sulfate is added to the reaction vessel and after about another 10 minutes, about 10 pounds of Epsom salts are added. The resultant composition is stirred for about 10 minutes. To this point, the aqueous reaction medium is maintained at about 190° F. The mixture is brought to a temperature of about 212° F. and maintained at this temperature, with constant stirring, for about 30 minutes. The resultant mixture is allowed to cool to about 150° F.; the container is filled to within about 8 inches of the top with water which has previously been heated to about 160° F. The mixture is stirred for about 5 minutes; 10 ounces of oil of pine (turpentine) is added; the mixture is stirred for about 5 minutes, and 0.5 cup of pork bacon oil is added. The mixture is thoroughly agitated and allowed to simmer at about 150° C. for about 30 minutes and allowed to sit at room temperature for about 12 hours. About 244 8 ounce bottles were filled with clear, greenish colored liquor drained from the reaction vessel.

A typical treatment for a dog afflicted with heart worm microfilariae using a composition made in accordance with the above example, would involve giving the dog one teaspoonful of the composition every day for 5 days. For ten days the dog would not be given the composition and then for 5 days the dog would again be given one teaspoonful a day. This procedure would be repeated until the dog had gone through four-five day periods in which it received one teaspoonful daily. Subsequent to this time the dog could be given one teaspoonful a month. For animals weighing less than 3 pounds, the dosage should be cut in half.

What is claimed is:

1. A method for treating dogs afflicted with heart worm microfilariae comprising administering to an afflicted dog an effective dosage of an aqueous composition prepared by reacting, in an aqueous medium at a temperature in the range of 150–212° F. and at atmospheric pressure;

(A) about one part by weight tobacco,
(B) about one part by weight Epsom salts,
(C) about 1.2 parts by weight hydrated lime,
(D) about 0.8 part by weight sulfur,
(E) about 0.8 part by weight ferrous sulfate, and
(F) about 21 fluid ounces of pine oil per 100 pounds of solid reactants A through E, allowing the resultant composition to settle whereby an aqueous phase and a solid phase are formed and recovering said aqueous phase by decanting a portion thereof as the treating composition.

2. The method of claim 1 wherein the treating composition includes a minor amount of pork bacon oil as a flavoring agent.

3. The method of claim 1 in which said sulfur contains about 0.45% arsenic present as an impurity.

4. A process for preparing a composition for treating dogs afflicted with heart worm microfilariae comprising reacting, in an aqueous medium at a temperature in the range of 150–212° F. and at atmospheric pressure;

(A) about one part by weight tobacco,
(B) about one part by weight Epsom salts,
(C) about 1.2 parts by weight hydrated lime,
(D) about 0.8 part by weight sulfur,
(E) about 0.8 part by weight ferrous sulfate, and
(F) about 21 fluid ounces of pine oil per 100 pounds of total solid reactants A through E, allowing the resultant composition to settle whereby an aqueous phase and a solid phase are formed and decanting a portion of the clear aqueous phase as the treating composition.

5. The process of claim 4 in which said sulfur contains about 0.45% arsenic present as an impurity.

References Cited

UNITED STATES PATENTS

| 320,096 | 6/1885 | Sleight | 424—141 |
| 117,065 | 7/1971 | George  | 424—195 |

OTHER REFERENCES

Gregory, Uses and Applications of Chemicals and Related Materials, Reinhold Pub. (1939), p. 358.

Milks, Practical Veterinary Pharmacology, Materia Media and Therapeutics (1949), pp. 391–393, 452, 576–577.

The Yearbook of Agriculture (1956), pp. 506–507.

The Merck Veterinary Manual, 2nd edit., pp. 890–893.

SAM ROSEN, Primary Examiner

U.S. Cl. X.R.

424—154, 157, 165, 196, 197